(12) United States Patent
Droz et al.

(10) Patent No.: US 9,304,203 B1
(45) Date of Patent: Apr. 5, 2016

(54) METHODS, DEVICES, AND SYSTEMS FOR IMPROVING DYNAMIC RANGE OF SIGNAL RECEIVER

(71) Applicant: Google Inc., Mountain View, CA (US)

(72) Inventors: Pierre-Yves Droz, Mountain View, CA (US); Gaetan Pennecot, San Francisco, CA (US); Daniel Gruver, San Francisco, CA (US)

(73) Assignee: Google Inc., Mountain View, CA (US)

( * ) Notice: Subject to any disclaimer, the term of this patent is extended or adjusted under 35 U.S.C. 154(b) by 378 days.

(21) Appl. No.: 13/802,593

(22) Filed: Mar. 13, 2013

(51) Int. Cl.
| | |
|---|---|
| *G01S 7/48* | (2006.01) |
| *G01S 13/06* | (2006.01) |
| *G01S 17/06* | (2006.01) |
| *G01S 17/88* | (2006.01) |
| *G01S 17/10* | (2006.01) |
| *G01S 7/02* | (2006.01) |
| *G01S 7/486* | (2006.01) |
| *G01S 7/489* | (2006.01) |

(52) U.S. Cl.
CPC ............... *G01S 17/107* (2013.01); *G01S 7/02* (2013.01); *G01S 7/48* (2013.01); *G01S 7/486* (2013.01); *G01S 7/4808* (2013.01); *G01S 7/489* (2013.01); *G01S 7/4868* (2013.01); *G01S 13/06* (2013.01); *G01S 17/06* (2013.01); *G01S 17/88* (2013.01)

(58) Field of Classification Search
CPC ......... G01S 7/48; G01S 7/4808; G01S 7/486; G01S 7/4868; G01S 7/489; G01S 13/06; G01S 15/88; G01S 15/93; G01S 15/931; G01S 13/93; G01S 13/931; G01S 17/88; G01S 17/93; G01S 17/931; G01S 17/06

USPC ......... 342/70–72, 91, 92, 104, 107, 109, 118, 342/175; 356/3–22, 27; 367/89–93, 99, 118
See application file for complete search history.

(56) References Cited

U.S. PATENT DOCUMENTS

| | | | | | |
|---|---|---|---|---|---|
| 3,283,323 | A | * | 11/1966 | Kirkpatrick | ......... G01S 13/4436 327/77 |
| 3,643,257 | A | * | 2/1972 | Thomson | .............. G01S 13/534 342/160 |
| 3,790,277 | A | | 2/1974 | Hogan | |
| 4,236,069 | A | * | 11/1980 | Laughlin | ................... G01J 1/44 250/214 AG |
| 4,603,250 | A | * | 7/1986 | Contini | ................. G01S 7/4816 250/214 VT |
| 4,700,301 | A | | 10/1987 | Dyke | |

(Continued)

OTHER PUBLICATIONS

Krainak, M. et al., "Photon Detectors with Large Dynamic Range and at Near Infrared Wavelength for Direct Detection Space Lidars," Proceedings of the SPIE, vol. 7320 (2009)., pp. 732005-732005-6 (2009), http://144.206.159.178/ft/CONF/16431836/16431840.pdf.

*Primary Examiner* — Peter Bythrow
(74) *Attorney, Agent, or Firm* — McDonnell Boehnen Hulbert & Berghoff LLP

(57) ABSTRACT

Methods, devices, and systems that may help improve the dynamic range of a signal receiver. The method includes (i) causing a signal emitter to emit a signal during a first period of time; (ii) receiving, at the signal receiver, a reflected signal during a second period of time, where the received reflected signal corresponds to the emitted signal, and where the second period of time begins after a beginning of the first period of time; and (iii) increasing a signal gain that is applied to the received reflected signal during a third period of time, where the third period of time begins not earlier than a beginning of the second period of time.

16 Claims, 14 Drawing Sheets

(56) References Cited

U.S. PATENT DOCUMENTS

| | | | |
|---|---|---|---|
| 4,709,195 A | 11/1987 | Hellekson et al. | |
| 4,967,270 A * | 10/1990 | Ulich | G01S 17/107 348/31 |
| 5,202,742 A | 4/1993 | Frank et al. | |
| 5,298,905 A | 3/1994 | Dahl | |
| 5,453,782 A * | 9/1995 | Hertel | H01J 31/507 348/217.1 |
| 5,656,808 A * | 8/1997 | Marche | H01J 29/98 250/214 VT |
| 5,691,808 A * | 11/1997 | Nourrcier, Jr. | G01S 7/497 356/5.01 |
| 5,892,616 A * | 4/1999 | Takahashi | H03F 3/087 359/341.43 |
| 6,031,421 A * | 2/2000 | McEwan | G01S 7/34 330/10 |
| 6,166,850 A * | 12/2000 | Roberts | H01S 3/1301 359/341.2 |
| 6,799,141 B1 | 9/2004 | Stoustrup et al. | |
| 6,841,766 B2 | 1/2005 | Gauthier, Jr. et al. | |
| 7,089,114 B1 * | 8/2006 | Huang | B60T 7/22 340/435 |
| 7,187,452 B2 * | 3/2007 | Jupp | G06K 9/0063 356/3.01 |
| 7,243,026 B2 * | 7/2007 | Kudo | B62D 15/0265 340/435 |
| 7,248,342 B1 | 7/2007 | Degnan | |
| 7,255,275 B2 | 8/2007 | Gurevich et al. | |
| 7,652,752 B2 | 1/2010 | Fetzer et al. | |
| 7,830,442 B2 * | 11/2010 | Griffis | G01S 7/486 348/231.99 |
| 7,969,558 B2 * | 6/2011 | Hall | G01S 7/4813 356/141.5 |
| 7,983,565 B2 | 7/2011 | Varshneya et al. | |
| 8,027,029 B2 * | 9/2011 | Lu | G01S 7/4802 356/28 |
| 8,050,863 B2 * | 11/2011 | Trepagnier | B60W 30/00 180/167 |
| 8,072,581 B1 | 12/2011 | Breiholz | |
| 8,081,301 B2 * | 12/2011 | Stann | G01C 3/08 356/4.01 |
| 8,085,388 B2 * | 12/2011 | Kaufman | G01B 11/2518 356/4.01 |
| 2003/0046025 A1 * | 3/2003 | Jamieson | G02B 26/101 702/159 |
| 2003/0103197 A1 * | 6/2003 | Shirai | G01S 7/489 356/5.01 |
| 2006/0044180 A1 * | 3/2006 | Ikeda | G01S 13/931 342/91 |
| 2006/0170504 A1 * | 8/2006 | Kim | H03F 3/45179 330/308 |
| 2006/0187111 A1 * | 8/2006 | Uchino | G01S 7/285 342/70 |
| 2007/0024841 A1 * | 2/2007 | Kloza | G01S 7/4811 356/5.03 |
| 2007/0216567 A1 * | 9/2007 | Ikeda | G01S 7/34 342/92 |
| 2008/0158042 A1 * | 7/2008 | Ishio | G01S 7/4868 342/54 |
| 2009/0262760 A1 * | 10/2009 | Krupkin | G01S 7/414 372/6 |
| 2010/0264301 A1 * | 10/2010 | Borosak | G01S 7/4804 250/252.1 |
| 2010/0277713 A1 * | 11/2010 | Mimeault | G01S 7/487 356/5.01 |
| 2010/0321755 A1 * | 12/2010 | Cho | G01S 7/4816 359/248 |
| 2011/0116072 A1 * | 5/2011 | Rousseau | G01S 7/4818 356/4.07 |
| 2013/0135606 A1 * | 5/2013 | Giacotto | G01C 3/08 356/5.01 |
| 2013/0229297 A1 * | 9/2013 | Mukai | G01S 7/28 342/92 |
| 2013/0242283 A1 * | 9/2013 | Bailey | G01S 17/89 356/4.01 |

* cited by examiner

METHODS, DEVICES, AND SYSTEMS FOR IMPROVING DYNAMIC RANGE OF SIGNAL RECEIVER

BACKGROUND

Unless otherwise indicated herein, the materials described in this section are not prior art to the claims in this application and are not admitted to be prior art by inclusion in this section.

Light Detection and Ranging (LIDAR) is an example of one remote sensing technology that may be utilized to acquire information on an environment. The acquired information may include the distances to, or other properties of, objects in the environment. A LIDAR device may use laser light in a range of wavelengths/frequencies, e.g., ultraviolet, visible, or infrared, to illuminate and acquire information on a variety of different types of objects, such as metallic and non-metallic items, geological formations, and even atmospheric elements.

In operation, a LIDAR device may be configured to illuminate a surrounding environment with light, detect light reflected off of objects within the environment, and determine object information based on the reflected light. In some environments, objects may be far away from the LIDAR device, such that the light travels a relatively long distance (both from the LIDAR to the object, and from the object back to the LIDAR). Consequently, the light travels for a relatively long period of time before returning to the LIDAR device. Because the light travels a long distance, and for a long period of time, the reflected light is often significantly attenuated by the time it returns to the LIDAR device. That is, the reflected light signal becomes increasingly weaker as the return time of the light increases. Thus, a received signal corresponding to a near object may be many times stronger than a signal corresponding to a far object In some arrangements, in an attempt to improve the ability to detect far-away objects, the sensitivity of a LIDAR signal receiver can be increased. However, as the sensitivity of the signal receiver is increased, it can become more difficult to accurately detect near objects. As a result, the dynamic range of the signal receiver may be negatively affected. Because the distance of objects in an environment may differ dramatically, however, such a decreased dynamic range of the signal receiver is undesirable.

SUMMARY

A range-finding device may be configured to carry out a method that helps increase the dynamic range of its signal receiver by applying a varying signal gain over time to a received signal. As noted above, the reflected signal of a range-finding device becomes increasingly weaker as the return time of the signal increases. Thus, in accordance with the present method, for signals reflected off of relatively near objects, a relatively low signal gain may be applied to the received signal. And, for signals reflected off of relatively far-away objects, a relatively high signal gain may be applied to the received signal. More particularly, throughout a period of time during which the reflected signal is received, the signal gain may be increased, for example, linearly, exponentially, or in some other non-linear manner.

In an implementation, the method may involve a signal emitter emitting a signal. The method may also involve a signal receiver receiving a reflected signal corresponding to the emitted signal, where the reflected signal is the emitted signal after it is reflected off of an object. Once the reflected signal is received, the method may additionally involve increasing a signal gain that is applied to the received reflected signal. In an example implementation, the increase in signal gain may involve increasing an operating voltage of the signal receiver. Accordingly, increasing the signal gain may result in applying a relatively small operating bias voltage to large received signals and a relatively large operating bias voltage to small received signals.

In this way, the method may help provide for a larger dynamic range of a range-finding device. That is, the method may help the range-finding device to sense the presence of objects over an increased range of distances.

In a first aspect, an example method may include (a) causing a signal emitter to emit a signal during a first period of time; (b) receiving, at a signal receiver, a reflected signal during a second period of time, where the received reflected signal corresponds to the emitted signal, and where the second period of time begins after a beginning of the first period of time; and (c) increasing a signal gain that is applied to the received reflected signal during a third period of time, where the third period of time begins not earlier than a beginning of the second period of time.

In a second aspect, a range-finding device may include (a) a signal emitter configured to emit a signal during a first period of time; (b) a signal receiver configured to receive a reflected signal during a second period of time, where the reflected signal corresponds to the emitted signal, and where the second period of time begins after a beginning of the first period of time; and (c) a signal amplifier configured to increase a signal gain that is applied to a received reflected signal received by the signal receiver during a third period of time, where the third period of time begins not earlier than a beginning of the second period of time.

In a third aspect, a light-detection and ranging (LIDAR) device may include (a) at least one laser source, where the at least one laser source is configured to emit a laser signal in a defined wavelength range during a first period of time; (b) at least one signal receiver, where the at least one signal receiver is configured to receive a light signal having wavelengths in the defined wavelength range during a second period of time, where the second period of time begins after a beginning of the first period of time; and (c) a signal amplifier configured to increase a signal gain that is applied to the light signal received by the at least one signal receiver during a third period of time, where the third period of time begins not earlier than a beginning of the second period of time.

In a fourth aspect, a non-transitory computer-readable medium may include (a) instructions for causing a signal emitter to emit a signal during a first period of time; (b) instructions for receiving, at a signal receiver, a reflected signal during a second period of time, where the received reflected signal corresponds to the emitted signal, and where the second period of time begins after a beginning of the first period of time; and (c) instructions for increasing a signal gain that is applied to the received reflected signal during a third period of time, where the third period of time begins not earlier than a beginning of the second period of time.

In a fifth aspect, example implementations may provide a range-finding device that includes (a) means for causing a signal emitter to emit a signal during a first period of time; (b) means for receiving a reflected signal during a second period of time, where the received reflected signal corresponds to the emitted signal, and where the second period of time begins after a beginning of the first period of time; and (c) means for increasing a signal gain that is applied to the received reflected signal during a third period of time, where the third period of time begins not earlier than a beginning of the second period of time.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be used, and other changes may be made, without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are contemplated herein.

I. Overview

Described herein are methods, devices, and systems that may be arranged, generally, to help provide an increased dynamic range of a signal receiver by applying a time-varying signal gain to a received signal. In one embodiment, at a high level, an example method may involve (i) causing a signal emitter to emit a signal during a first period of time, (ii) receiving, at a signal receiver, a reflected signal during a second period of time, and (iii) increasing a signal gain that is applied to the received reflected signal during a third period of time.

In other embodiments, some aspects of the example methods described herein may be carried out in whole or in part by a suitable device or components thereof. Some aspects of the example methods may also be carried out in whole or in part by a system or systems that are remote from such a device.

For instance, in one implementation, aspects of the example methods described herein may be carried out by a range-finding device, for example a RADAR device, a SONAR device, or a LIDAR device, among other examples. In other implementations, aspects of the example methods may be performed by a system or subsystem of an autonomous vehicle such as a driverless automobile that is configured to analyze its surrounding environment based on a point cloud (i.e., three-dimensional spatial-point data) obtained by a LIDAR.

It should be understood that in an implementation in which aspects of the example methods are performed by a system or subsystem of an autonomous vehicle, the autonomous vehicle may be fully autonomous or partially autonomous. In a partially autonomous vehicle, some functions may be manually controlled (e.g., by a person) some or all of the time. Further, a partially autonomous vehicle could be configured to switch between a fully-manual operation mode and a partially- or fully-autonomous operation mode.

II. Example Methods

Figure 1A:
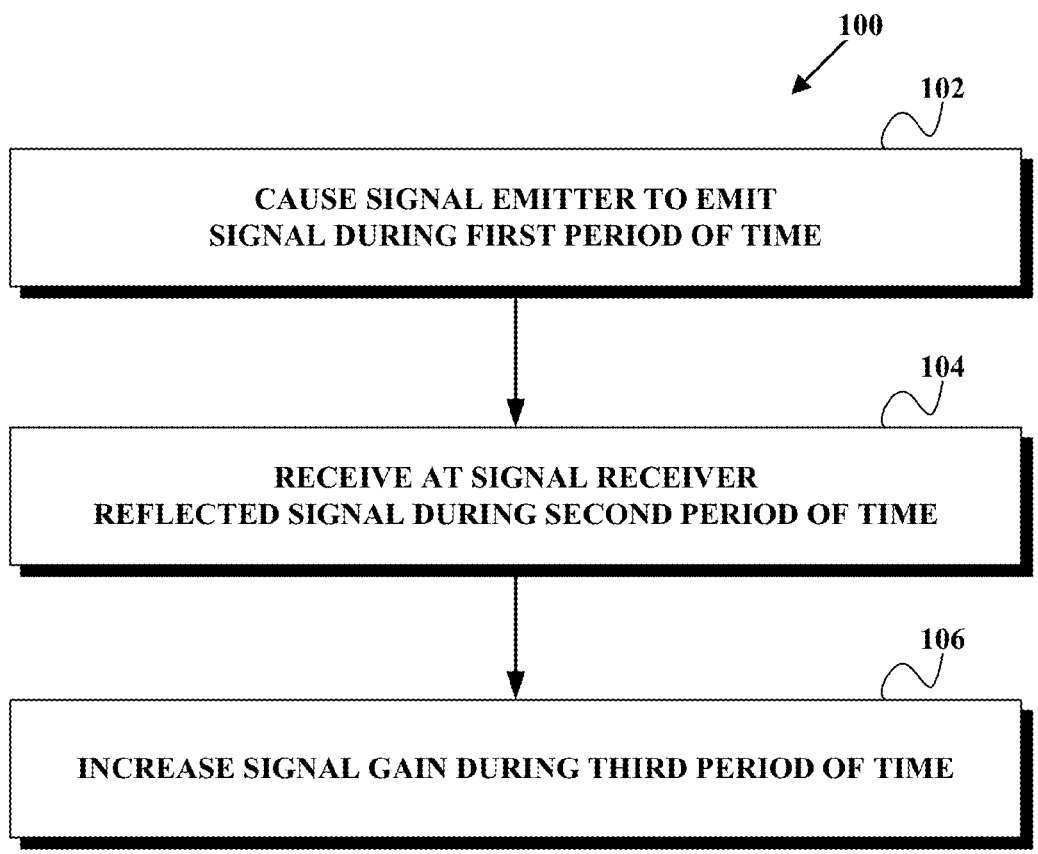
FIG. 1A shows a flowchart of an example method for increasing the dynamic range of a signal receiver.

FIG. 1A shows a flowchart of an example method 100 for increasing the dynamic range of a signal receiver. Method 100 may be carried out by any suitable device/system (e.g., a range-finding device and/or a system of an autonomous vehicle). Other suitable devices/systems are also possible.

Furthermore, those skilled in the art will understand that the flowchart described herein depicts functionality and operation of certain implementations of example embodiments. In this regard, each block of the flowchart may represent a module, a segment, or a portion of program code, which includes one or more instructions executable by a processor for implementing specific logical functions or steps in the process. The program code may be stored on any type of computer-readable medium (e.g., such as a storage device including a disk or hard drive). In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those skilled in the art.

At a high level, as shown by block 102, method 100 may involve a range-finding device causing a signal emitter to emit a signal during a first period of time. Further, as depicted by block 104, method 100 may involve a signal receiver associated with the range-finding device receiving a reflected signal during a second period of time, where the received reflected signal corresponds to the emitted signal, and where the second period of time begins after a beginning of the first period of time. Additionally, as shown by block 106, method 100 may involve the range-finding increasing a signal gain that is applied to the received reflected signal during a third period of time, where the third period of time begins not earlier than a beginning of the second period of time. Each block of method 100 will be discussed in further detail below.

Figure 1B:
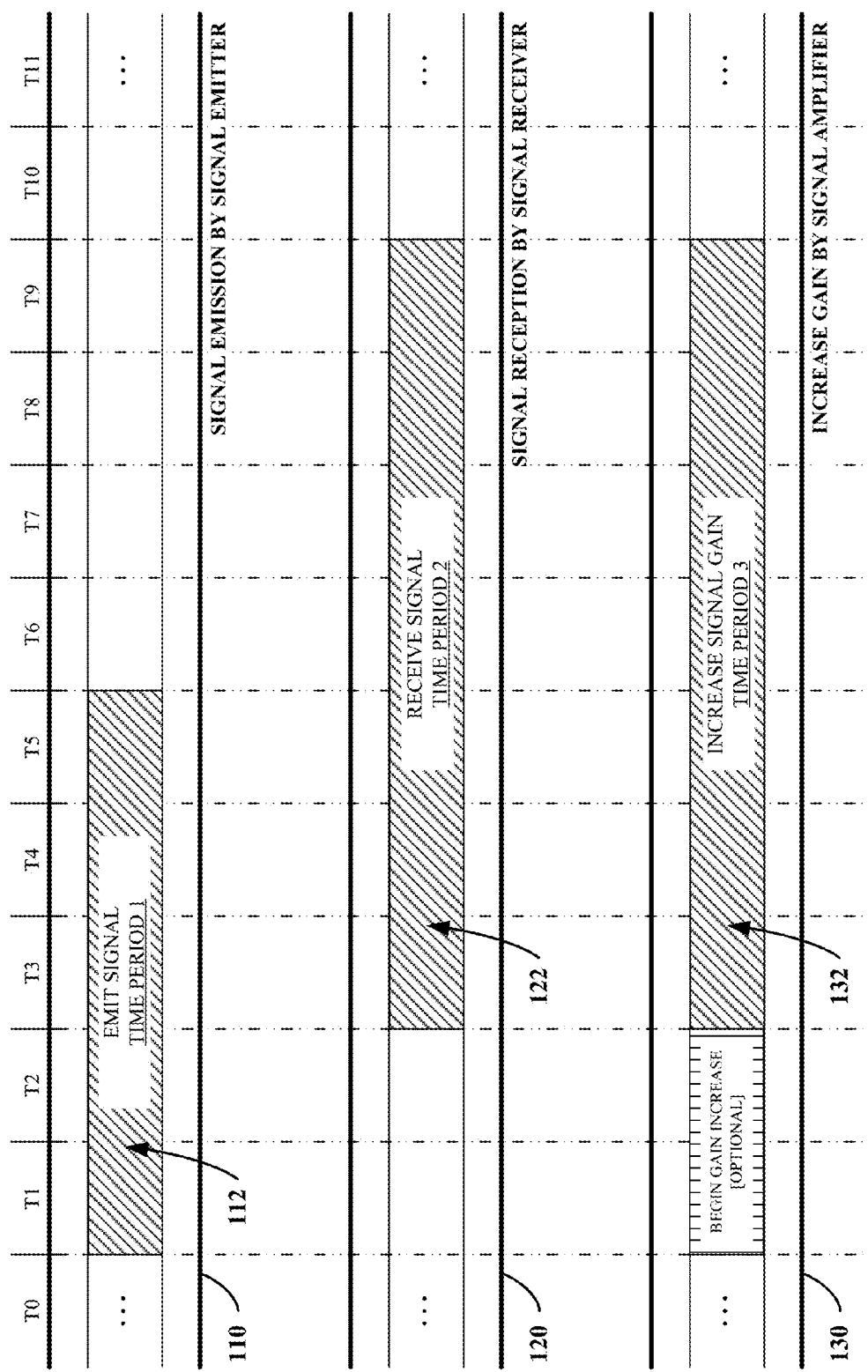
FIG. 1B shows a signal-time plot according to an example method.

Moreover, example method 100 is further described herein with reference to FIG. 1B, which shows a signal-time plot according to example method 100. The signal-time plot of FIG. 1B includes: signal-time chart 110, which corresponds to a signal emission by a signal emitter; signal-time chart 120, which corresponds to a signal reception by a signal receiver; and signal-time chart 130, which corresponds to an increase in signal gain by a signal amplifier.

A. Cause Signal Emitter to Emit Signal During First Period of Time

As shown by block 102, method 100 involves causing a signal emitter to emit a signal during a first period of time. The signal emitter may be any suitable device/component capable of emitting a signal. And, as a general matter, the emitted signal may be any suitable signal capable of propagating in the atmosphere that is useful for helping detect the presence of objects. For example, the signal emitter may be a radio-wave emitter of a RADAR device, a sound-wave emitter of a SONAR device, or a light-wave emitter of a LIDAR device, among other examples. Other examples of signal emitters and corresponding signals are certainly possible.

As noted, in one implementation, the signal emitter may be configured to transmit radio-wave signals. Further, the signal emitter may be configured to emit a radio wave signal at a defined wavelength and/or wavelength range. Accordingly, the emitted signal may be a radio wave signal at or about a particular wavelength. For example, the emitted signal may be a radio wave signal with a wavelength in the range of 1 millimeter (mm) to 100 kilometers. These example wavelengths are discussed for purposes of example and explanation only and should not be taken to be limiting. Other wavelengths are also possible.

In other implementations, the signal emitter may be configured to transmit sound-wave signals. For example, the signal emitter may include a sound generator and/or an electro-acoustic transducer/array, among other examples. Further, the signal emitter may be configured to emit a sound wave at a defined wavelength and/or wavelength range. Accordingly, the emitted signal may be a sound wave at or about a particular wavelength. For example, the emitted signal may be a sound wave with a wavelength in the range of 17 mm to 17 meters. These example wavelengths are discussed for purposes of example and explanation only and should not be taken to be limiting. Other wavelengths are also possible.

In other implementations, the signal emitter may include a laser source, and the emitted signal may be a laser signal. The laser source may be any suitable device/component capable of emitting a laser signal. The laser source may be configured to emit a continuous laser light beam and/or laser pulses. The laser source may be a gas laser, a chemical laser, a solid-state laser, or a semiconductor laser diode ("laser diode"), among other possible types of lasers.

Further, the laser source may include any suitable number of and/or combination of laser devices. For example, the laser source may include multiple laser diodes and/or multiple solid-state lasers, among other combinations of laser types.

The laser source may be configured to emit a laser signal at a defined wavelength and/or wavelength range. For example, the laser source may include at least one laser diode configured to emit a laser signal in a particular wavelength range. The defined wavelength of the emitted laser signal may be one of about 905 nanometers (nm) and about 1550 nm. These example wavelengths are discussed for purposes of example and explanation only and should not be taken to be limiting. Other wavelengths are possible as well.

As noted above, in accordance with block 102, the signal emitter may emit the signal during a first period of time. The first period of time may be any suitable period of time. For example, the first period of time may be one of about 3 nanoseconds (ns) and about 5 ns. More specifically, referring to signal-time chart 110 of FIG. 1B, the signal emitter may emit the signal during first period of time 112. As depicted, first period of time 112 may be 5 ns in duration (where each time interval, T1-T11, denotes 1 ns), such that T1 represents the beginning of first period of time 112 and T5 denotes the end of first period of time 112 (i.e., the signal is emitted for 5 ns, starting at T1 and ending at T5). It should be understood that the above discussed first period of time is for purpose of example and explanation only. Other durations of time may be suitable as well.

B. Receive at Signal Receiver Reflected Signal During Second Period of Time

Returning back to FIG. 1A, at block 104, method 100 may also involve receiving, at a signal receiver, a reflected signal during a second period of time. The received reflected signal may correspond to the emitted signal (i.e., the reflected signal may be the signal emitted in accordance with block 102, after having been reflected off of an object). The signal receiver may be any suitable device/component configured to receive the reflected signal. For example, the signal receiver may include an antenna, a receiver, a microphone, an ultrasonic sensor, and/or a photosensor, among other examples.

More specifically, in one implementation, the signal receiver may be an antenna configured to receive radio-wave signals. Further, the antenna may be configured to receive radio wave signals at a particular wavelength and/or in a wavelength range (e.g., a radio wave signal with a wavelength in the range of 1 mm to 100 kilometers). The antenna may be configured to convert a detected radio-wave signal into an electrical signal represented by current and/or voltage.

In some implementations, the signal receiver may be a microphone configured to receive sound-wave signals. Further, the microphone may be configured to receive sound-wave signals at a particular wavelength and/or in a wavelength range (e.g., a sound wave with a wavelength in the range of 17 mm to 17 meters). The microphone may be configured to convert a detected sound-wave signal into an electrical signal represented by current and/or voltage.

In other implementations, the signal receiver may include at least one photosensor. The photosensor may be any suitable device that is configured to detect the presence of light (e.g., laser light). The photosensor may be configured to detect particular wavelengths/frequencies of light (e.g., ultraviolet, visible, and/or infrared). The photosensor may be configured to convert a detected light signal into an electrical signal represented by current and/or voltage. Example photosensors may include a photodiode, a bipolar phototransistor, a light emitting diode, and/or a photosensitive field-effect transistor, among other examples. In some implementations, the photosensor may be one of a PIN photodiode or an avalanche photodiode. In other implementations, the photosensor may include multiple sensing devices/components (e.g., multiple photosensors).

In operation, such a photosensor may receive an optical signal, e.g., a reflected laser light beam at the input of the photosensor. And, as noted, the photosensor may convert the optical signal into an electrical current. Also as noted above, in an example implementation, the photosensor may be an avalanche photodiode (APD). In APDs, incoming photons generally trigger a charge avalanche. Typically, a reverse bias voltage is applied to the APD, and charge carriers set free by light produce even further charge carriers through impact ionization. The current, I, generated by this avalanche process may be described by Equation 1:

$$I = R_0 \times M \times P_S \quad \text{Equation 1}$$

where $R_0$ is the spectral sensitivity of the APD, M is the internal gain of the APD, and $P_S$ is the incident optical power. The gain M of the APD is correlated to the applied reverse bias voltage.

Further, the gain of the photosensor may be related to an operating bias voltage of the photosensor. In some examples, the operating bias voltage may be a positive bias voltage. In other examples, the operating bias voltage may be a negative bias voltage. In one implementation, the photosensor may be configured such that its internal gain may be proportional to the operating bias voltage. For example, as the operating bias voltage is increased, a photosensor gain may increase such that the photosensor is able to help detect increasingly weaker received signals. The bias voltage in the APD is generally higher than in conventional photodiodes. By applying a high reverse bias voltage (typically 100-200 V in silicon), the APD is designed to experience the avalanche "breakdown" at specified voltages.

Figure 1C:
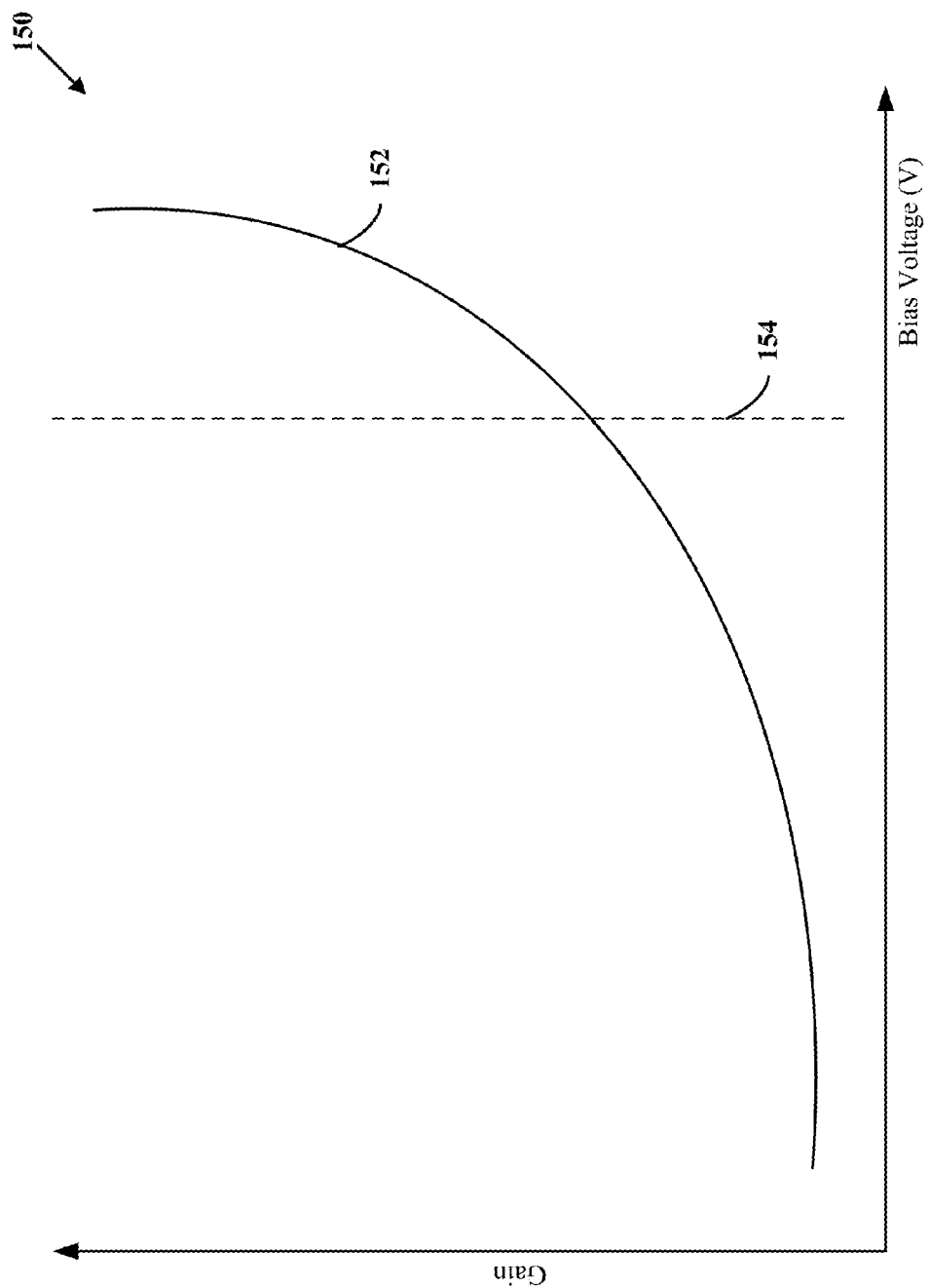
FIG. 1C shows an example plot of gain as a function of bias voltage.

FIG. 1C shows a plot 150 of the gain of an avalanche photodiode as a function of bias voltage, in accordance with an example embodiment. As shown, as the operating bias voltage of the APD increases, the APD generates an increasing internal gain 152. As the bias voltage nears the breakdown voltage 154 of the APD, the gain 102 increases rapidly. The sensitivity of the photodiode also increases rapidly.

Notably, as depicted in FIG. 1C, when the bias voltage of the APD approaches the breakdown voltage 154, the gain 152 of the APD varies strongly with the bias voltage. As such, even a small change in the bias voltage can result in a large change in the internal gain (and the sensitivity) of the APD. In an implementation, the operating voltage of the APD may be generally increased until it is approximately a predefined amount, or within a predefined range such as 200V±35V. However, other examples may exist and this example should not be taken to be limiting.

As noted above, in accordance with block 104, the signal receiver may receive the reflected signal during the second period of time. The second period of time may begin after the beginning of the first period of time. Recall, for instance, that the signal may be emitted at the beginning of the first period of time. Accordingly, the second period of time may begin when the reflected signal is first received, after the emitted signal has reflected off an object in the environment and returned to the signal receiver.

For example, referring to signal-time chart 120 of FIG. 1B, the signal receiver receives the reflected signal at second period of time 122. Notably, the beginning of second period of time 122 (i.e., T3) starts after the beginning of first time period 112 (i.e., T1). Furthermore, second period of time 122 has a duration of 7 ns (i.e., the signal receiver may receive the reflected signal for 7 ns). The second period of time may be longer than the first period of time because, for instance, the emitted signal may be reflected off of objects that are varying distances from the signal receiver. Other durations of time, beginnings of time, and endings of time may be suitable as well.

C. Increase Signal Gain During Third Period of Time

Returning again to FIG. 1A, at block 106, method 100 may involve increasing a signal gain that is applied to the received reflected signal during a third period of time. In one implementation, increasing the signal gain may include increasing an operating voltage of the signal receiver. In some implementations, increasing the signal gain may include increasing the signal gain linearly or substantially linearly during the third period of time. In other implementations, increasing the signal gain may involve increasing the signal gain non-linearly during the third period of time.

As a general matter, the signal gain may be increased in accordance with block 106 after the emission of the signal in accordance with block 102 and/or after the receipt of the signal in accordance with block 104. The increase in the signal gain may help account for the degradation of the signal after it is emitted. As the signal travels through the environment, portions of the signal may be scattered. As such, the further the signal travels, correspondingly less of the originally-emitted signal may return to the signal receiver. Indeed, in an implementation that involves a laser, the strength of the emitted laser signal may generally decrease as a function of the distance traveled according to a $1/R^2$ relationship, where R is the distance travelled. The signal gain that is increased in accordance with block 106 may generally help compensate for this decrease in the signal strength.

The signal gain may be increased as a function of time (e.g., the signal gain may be increased directly or inversely proportional to time). In some implementations, the signal gain may be increased as a function of at least one of the first period of time, the second period of time, and the third period of time. For instance, the gain may be increased as a function of the amount of time elapsed since emission of the signal, and so the applied gain may be increased as a function of time elapsed since the beginning of the first period of time. Additionally or alternatively, the gain may be increased as a function of the amount of time elapsed since first receipt of the reflected signal, and so the applied gain may be increased as a function of time elapsed since the beginning of the second period of time. Additionally, or alternatively, the gain may be increased as a function of the amount of time during which the gain itself is increased, and so the applied gain may be increased as a function of time elapsed since the beginning of the third period of time.

In some implementations, the signal gain may be increased by a signal amplifier, a power source, and/or any suitable circuit architecture. Generally, the signal amplifier may be any suitable device that is configured to increase, convert, or otherwise alter an electrical signal. For example, the signal amplifier may be a differential amplifier, an operational amplifier, a fully differential amplifier, a negative feedback amplifier, or a variable gain amplifier (VGA), among other amplifier types. Generally, the power source may be any suitable device that is configured to supply a particular required electrical voltage and/or current.

Figure 1D:
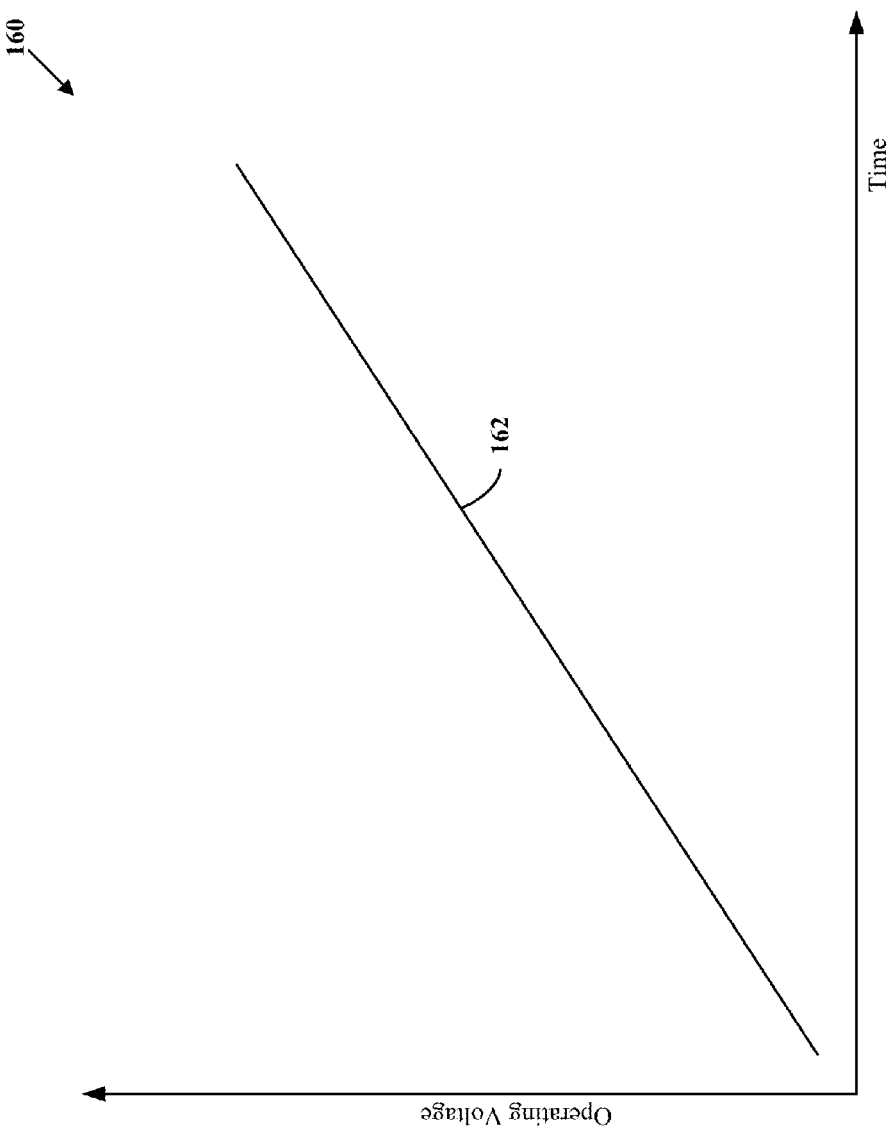
FIG. 1D shows an example of a linear plot of operating voltage as a function of time.
Figure 1E:
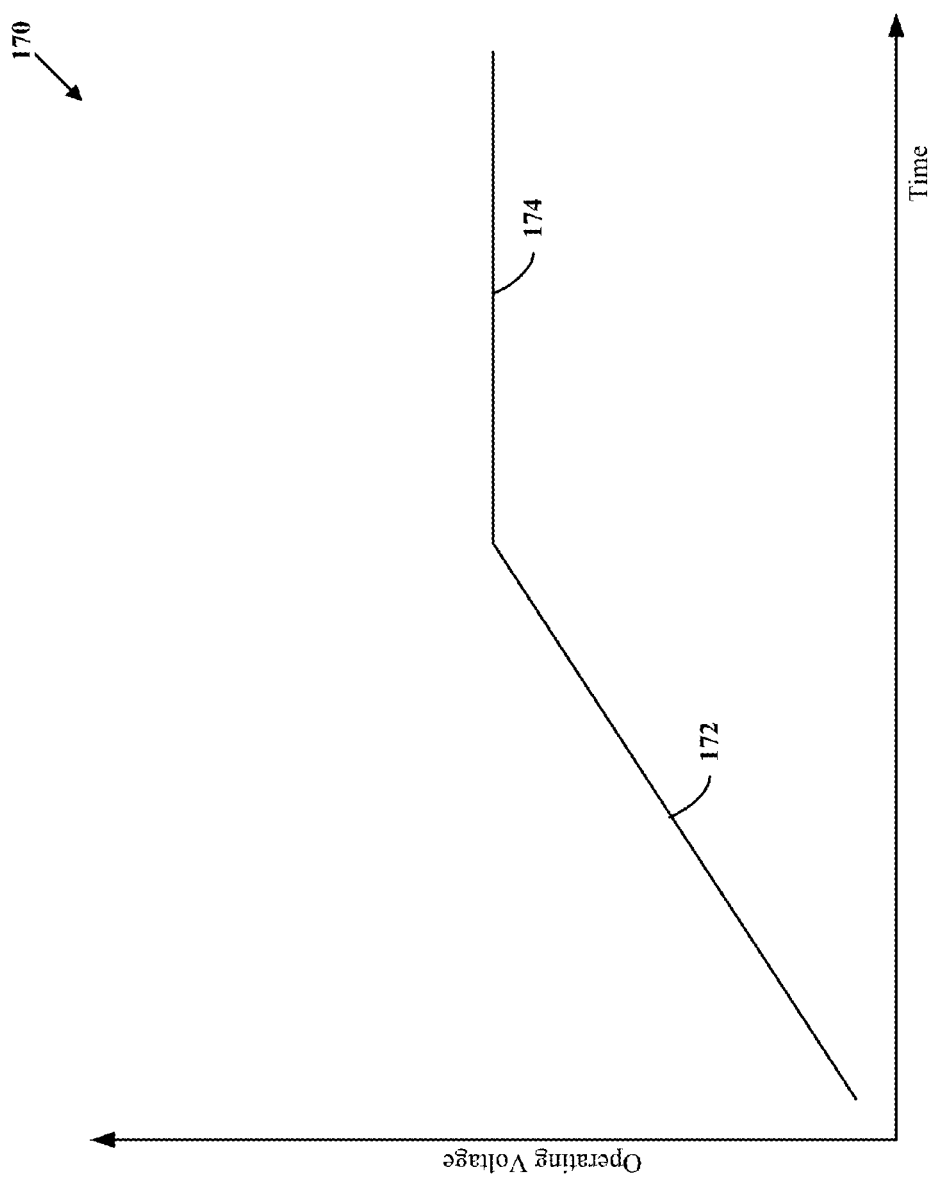
FIG. 1E shows an example of a piecewise linear plot of operating voltage as a function of time.
Figure 1F:
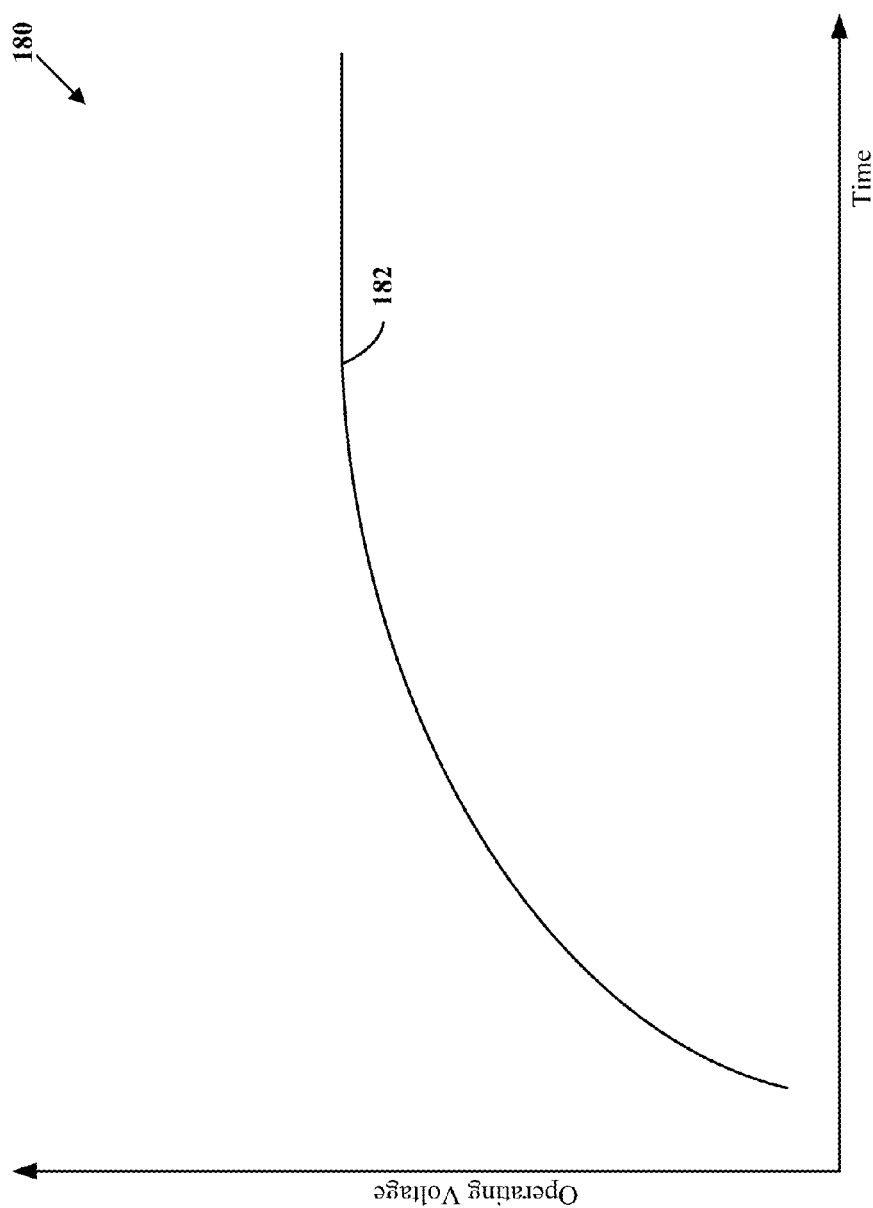
FIG. 1F shows an example of a non-linear plot of operating voltage as a function of time.

As noted above, in some implementations, increasing the signal gain may additionally and/or alternatively include increasing an operating voltage of the signal receiver. FIGS. 1D, 1E, and 1F show simplified voltage-time plots, which may depict example operating voltages applied during the third period of time.

In an example implementations, in accordance with the examples set forth in FIGS. 1D-1F, the operating voltage may generally be increased throughout a predefined range. For example, in accordance with the preferred operating point of an example APD described above, the operating voltage may be increased from approximately 200-35V (or 165V) to 200V. However, other examples may exist and this example should not be taken to be limiting.

FIG. 1D depicts a plot 160 of an example linear voltage ramp applied during the third period of time. As shown, according to this example, operating voltage 162 is generally increased in a linear fashion as time progresses. It should be understood that the example shown in FIG. 1D is set forth for purposes of example only, and should not be taken to be limiting. Other examples may exist.

FIG. 1E depicts a plot 170 of an example piecewise linear voltage ramp applied during the third period of time. As shown, according to this example, operating voltage 172 is first increased linearly. Then, after some time, operating voltage 174 is maintained at a constant (or approximately constant) voltage. It should be understood that the example shown in FIG. 1E is set forth for purposes of example only, and should not be taken to be limiting. Other examples may exist.

FIG. 1F depicts a plot 180 of an example non-linear voltage ramp applied during the third period of time. As shown, according to this example, operating voltage 182 is generally increased in a non-linear fashion as time progresses. In a particular implementation, the ramp profile of the non-linear voltage ramp may exhibit exponential decay, such as that exhibited by the response of an RC filter. In particular, the operating voltage over time may take the form of Equation 2:

$$V_{OV}(t) = V_0(t)\left(1 - e^{-\frac{t}{RC}}\right) \quad \text{Equation 2}$$

where $V_{OV}(t)$ is the operating voltage at a given time, $V_0$ is the initial operating voltage, and R and C represent the value of resistive and capacitive circuit components that may be tuned to control the response of the system.

The third period of time may begin not earlier than the beginning of the second period of time (i.e., the third period of time may begin at the same time as or sometime after the beginning of the second period of time). For example, referring to signal-time chart 130 of FIG. 1B, the signal amplifier may increase the signal gain during third time period 132. Notably, third time period 132 begins at the same time second time period 122 begins. However, this is not necessary. It should be understood that the beginning of third time period 132 may begin after the beginning of second time period 122 (e.g., at time T4) without departing from the present invention.

Additionally, as depicted, the signal gain may be increased during the entire period of time in which the signal receiver receives the reflected signal (i.e., the duration of third time period 132 is equivalent to the duration of second time period 122). But this is also not necessary. The signal gain may be applied beginning sometime after the beginning of second time period 122 (e.g., at time T4).

In some implementations, the method may involve increasing the signal gain sometime before the beginning of the third period of time. In particular, in one implementation, the signal receiver may be a photosensor (e.g., a photodiode), and an operating bias voltage may be increased before the beginning of the third period of time. For example, as depicted in signal-time chart 130 of FIG. 1B, the gain increase may begin before the beginning of third time period 132. Such practice may be used to place the signal receiver in a given state of operation at the beginning of the third period of time. For instance, it may be desirable to "warm up" the signal receiver, or otherwise ramp the signal receiver to a given gain prior to the beginning of the third time period.

In alternative implementations, increasing the signal gain may be based on at least one environment condition. For example, increasing the signal gain may include increasing the signal gain based on a time of day, an ambient temperature, and/or an amount of ambient light. For instance, when it is raining, reflectivity of the environment may generally be relatively high, and so the applied gain may be generally decreased. Additionally or alternatively, when the amount of ambient light in the environment is relatively high, there may be relatively more noise, and so the applied gain may be generally increased. Other conditions/factors are also possible.

III. Example LIDAR Overview

As noted above, the example methods may be carried out by a suitable device/system (e.g., a range-finding device or a system/subsystem of an autonomous vehicle). More specifically, in one implementation, the example methods may be carried out by a LIDAR device/system.

For purposes of example and explanation, an overview of some aspects of the principles of operation of an example LIDAR device is now provided. Those of skill in the art will appreciate that some such principles of operation may apply equally, or similarly, to other range-finding devices such as RADAR devices and/or SONAR devices, among other examples.

Generally, a LIDAR device may include any sensor configured to sense objects in the environment in which the LIDAR device is located using a laser signal (e.g., the signal receiver as described above with respect to method 100). Depending upon the implementation, the LIDAR device may also include, for example, one or more laser sources, (e.g., the laser sources as described with respect to method 100) and a scanning element, among other system components.

As a general matter, the LIDAR device may be used to detect objects near and/or around the LIDAR device. In an implementation, the LIDAR device may redirect a laser signal (also referred herein as a "laser beam") using one or more scanning elements (e.g., a mirror), among other components. Such a scanning element may be configured so as to be rotatable about its axis; accordingly the laser signal may be directed in a circular range of motion about the LIDAR device.

The LIDAR device may regularly emit the laser signal, and suitable sensors/detectors may receive reflected signals (i.e., reflections of the emitted laser signal) off of objects in the environment. The LIDAR device may be configured to have any desirable viewing angle, including any viewing angle up to and including 360 degrees. And, as noted, the LIDAR device may include various sensors and/or circuits arranged to detect reflected signals off of various objects at various distances in the environment. In this way, the LIDAR device may operate in an environment so as to receive spatial-point data corresponding to the environment.

Figure 2B:
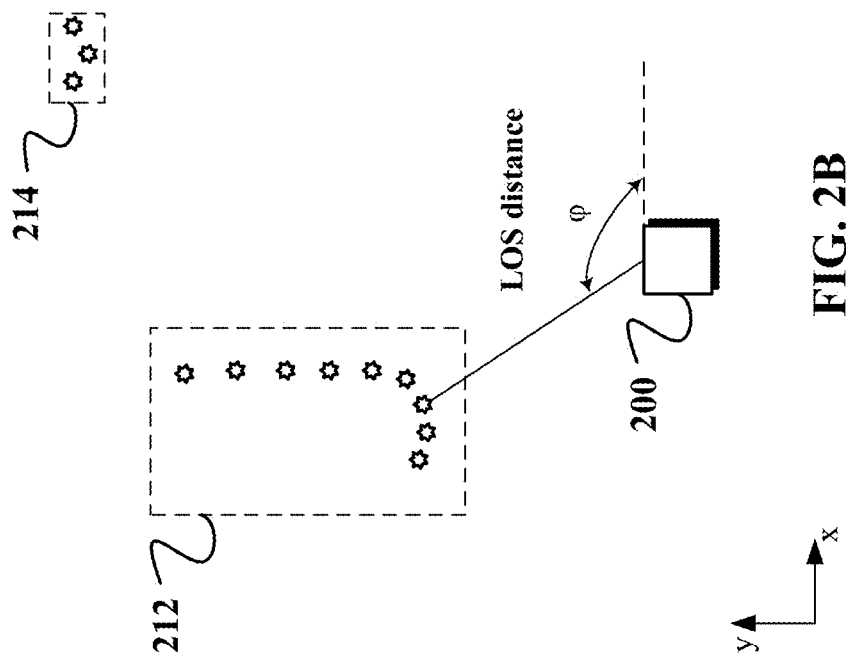
FIG. 2B shows an example point cloud for the two objects scanned in the scenario shown in FIG. 2A.
Figure 2A:
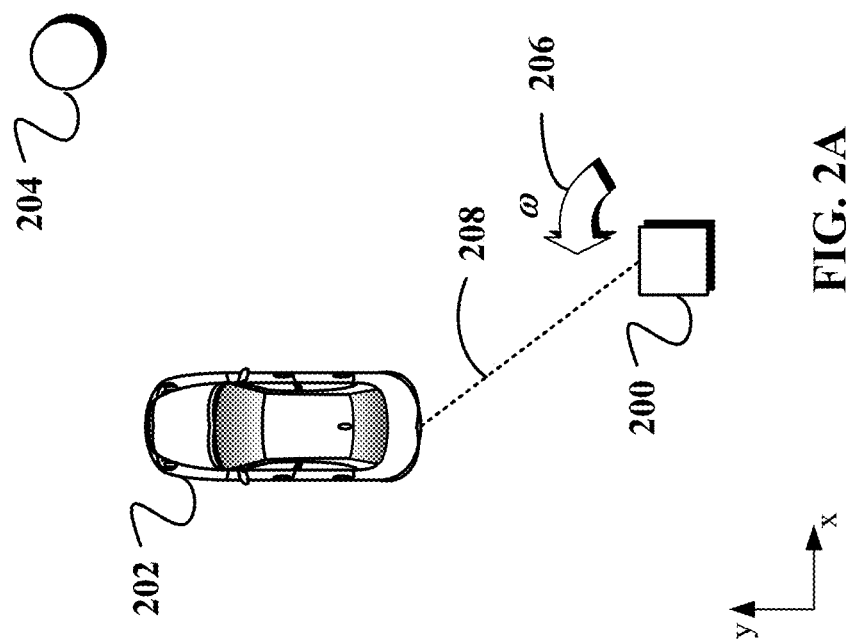
FIG. 2A shows an example scenario in which a LIDAR device scans an environment that includes two objects.

FIGS. 2A and 2B show an example application of a LIDAR device 200, which may be configured to carry out the example methods described above. In this example application, LIDAR device 200 is used to scan an environment that includes a road. Thus, LIDAR device 200 could be in a vehicle, such as an autonomous vehicle, that is traveling on the road. The environment of LIDAR device 200 in this example includes another vehicle 202 and road sign 204. To scan through the environment, LIDAR device 200 rotates a scanning element, which could be a mirror, according to motion reference arrow 206 with angular velocity w. While rotating, LIDAR device 200 regularly (e.g., periodically) emits pulsed laser beams, such as laser beam 208. Light from the emitted laser beams is reflected by objects in the environment, such as vehicle 202 and sign 204, and are detected by one or more detectors in LIDAR device 200. Time-stamping the receipt of the reflected signals allows for associating each reflected signal (if any is received at all) with the most recently emitted laser pulse and measuring the time delay between emission of the laser pulse and reception of the reflected light. The time delay provides an estimate of the distance to the reflective feature based on the speed of light in the intervening atmosphere. Combining the distance information for each reflected signal with the orientation of scanning element in LIDAR device 200 for the respective pulse emission allows for determining a position of the reflective feature in three-dimensions.

Further, it is of note that although a rotatable scanning element is described above, this is not necessary. In an implementation that does not utilize such a rotatable scanning element, the laser itself (or an assembly associated therewith) may be rotated.

FIG. 2B shows an example point cloud resulting from LIDAR device 200 scanning the environment shown in FIG. 2A. For purposes of illustration, the scan is assumed to be in an x-y plane that is generally horizontal (e.g., parallel to the surface of the road). It is to be understood, however, that the scan could include a vertical component (z-dimension) as well. In this example, the point cloud includes spatial points 212 corresponding to reflections from vehicle 202 and spatial points 214 corresponding to reflections from sign 204. Each spatial point in the point cloud has a line of sight ("LOS") distance from LIDAR device 200 and an azimuthal angle cp in the x-y plane. In this way, the scanning by LIDAR 200 can provide information regarding the locations of reflective objects in its environment.

Figure 3A:
FIGS. 3A-3D show various example images and corresponding example spatial-point data.
Figure 3B:
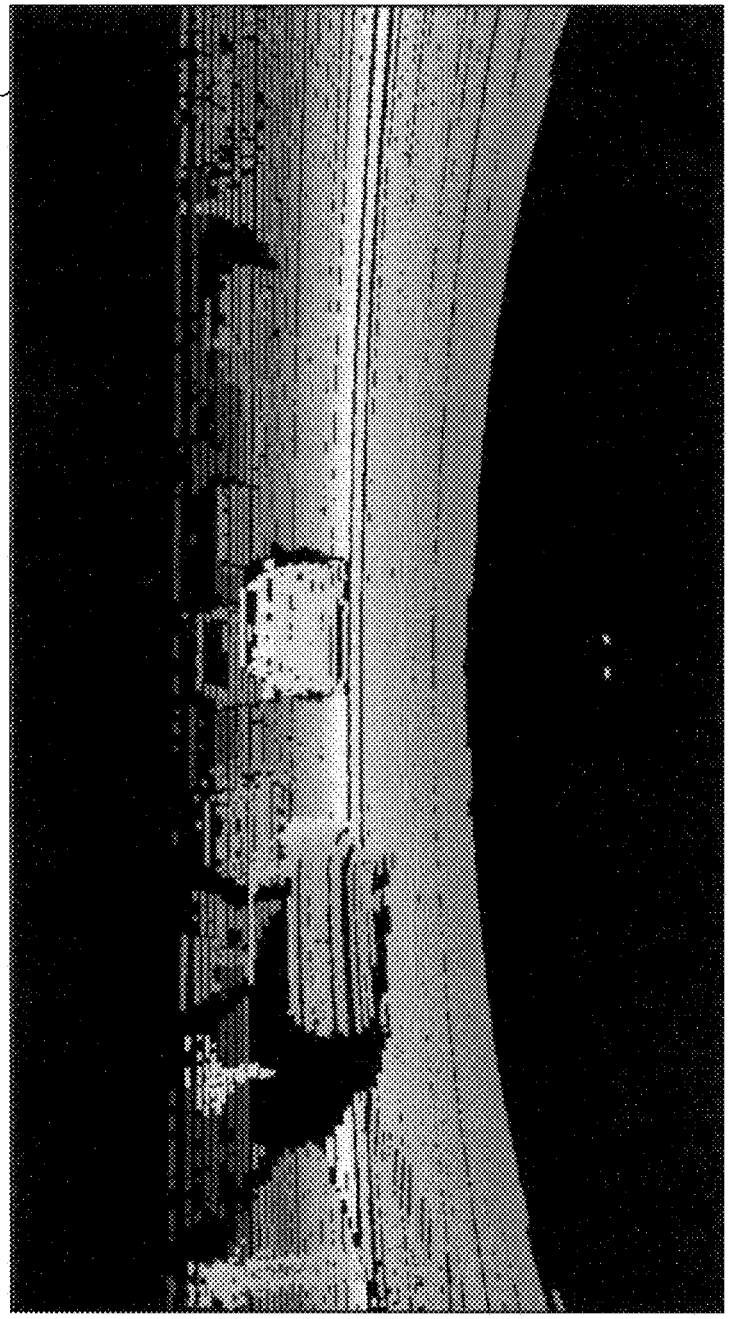
Figure 3C:
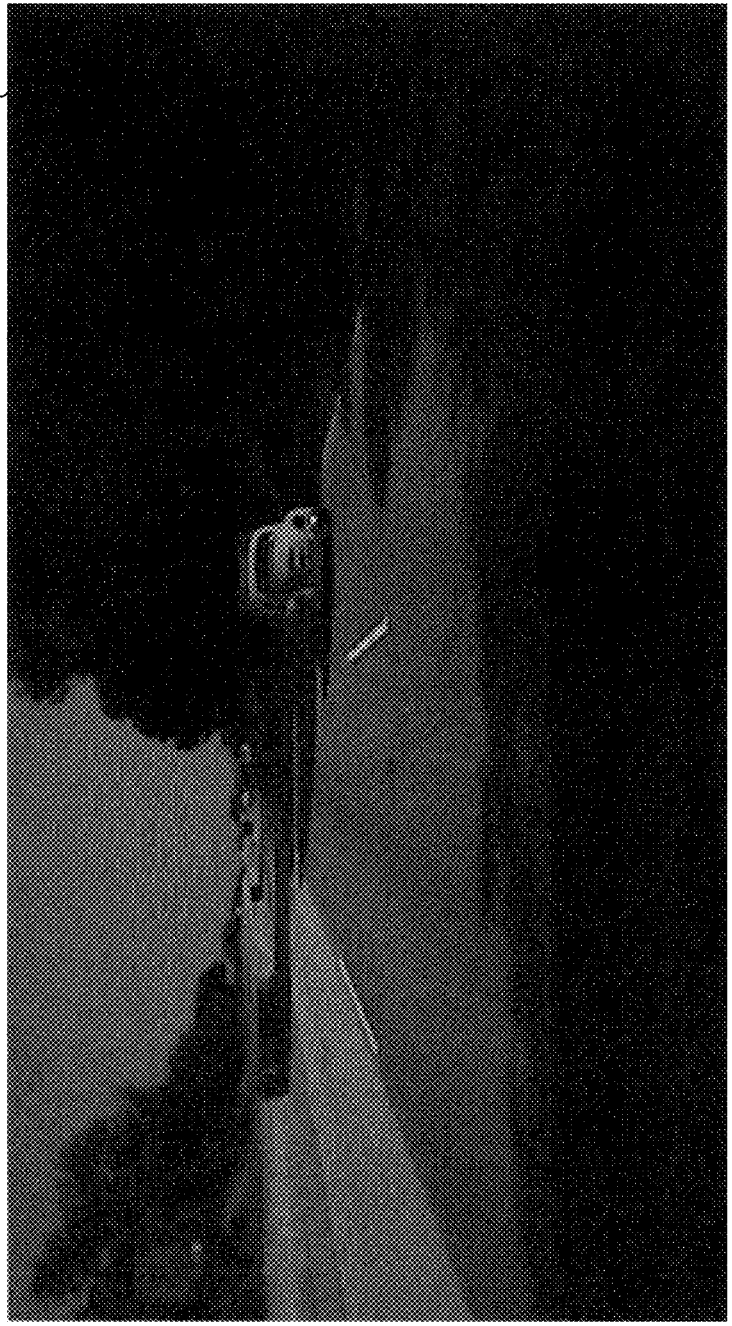
Figure 3D:
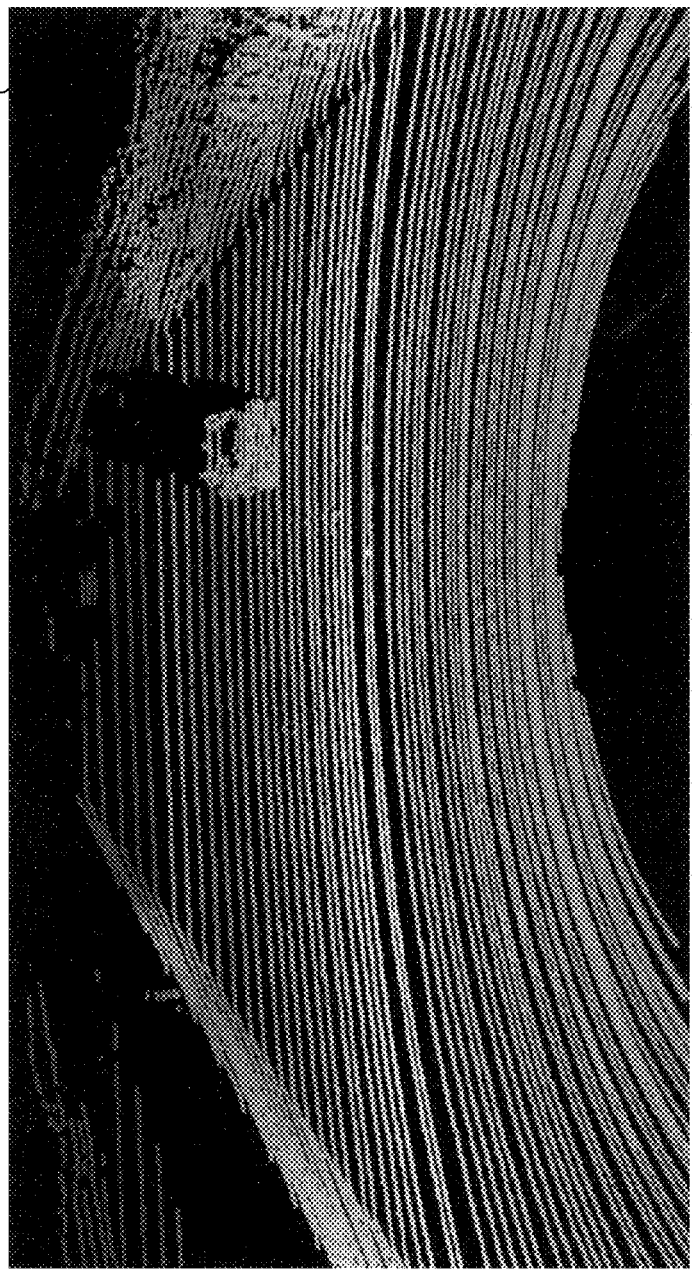

As spatial-point data is captured by the LIDAR device, the data may be communicated to an object detector, which may analyze the image to determine whether there is an object present in the environment. The object in the captured spatial-point data may be any type of object including, for example, a vehicle, pedestrian, road sign, traffic light, or traffic cone, among other examples FIGS. 3A-3D are examples of various images and corresponding spatial-point data that may be captured by the LIDAR device. FIG. 3A is a first example of a raw camera image 302 captured by a camera. FIG. 3B includes an example laser point cloud image 304 of the view shown in the first raw camera image 302. FIG. 3C is a second example of a raw camera image 306 captured by a camera. FIG. 3D includes an example laser point cloud image 308 of the view shown in raw camera image 306.

As shown in the examples of FIGS. 3B and 3D, in some respects, a laser point cloud image may substantially or approximately correspond to a raw camera image captured by a camera. Moreover, FIGS. 3B and 3D show that the LIDAR device may be configured to capture more than one type of laser point cloud image. The LIDAR device may also be configured to capture other types of perspectives using other types of sensors as well.

III. Example Devices/Systems

A. Example Range-Finding Devices

Figure 4:
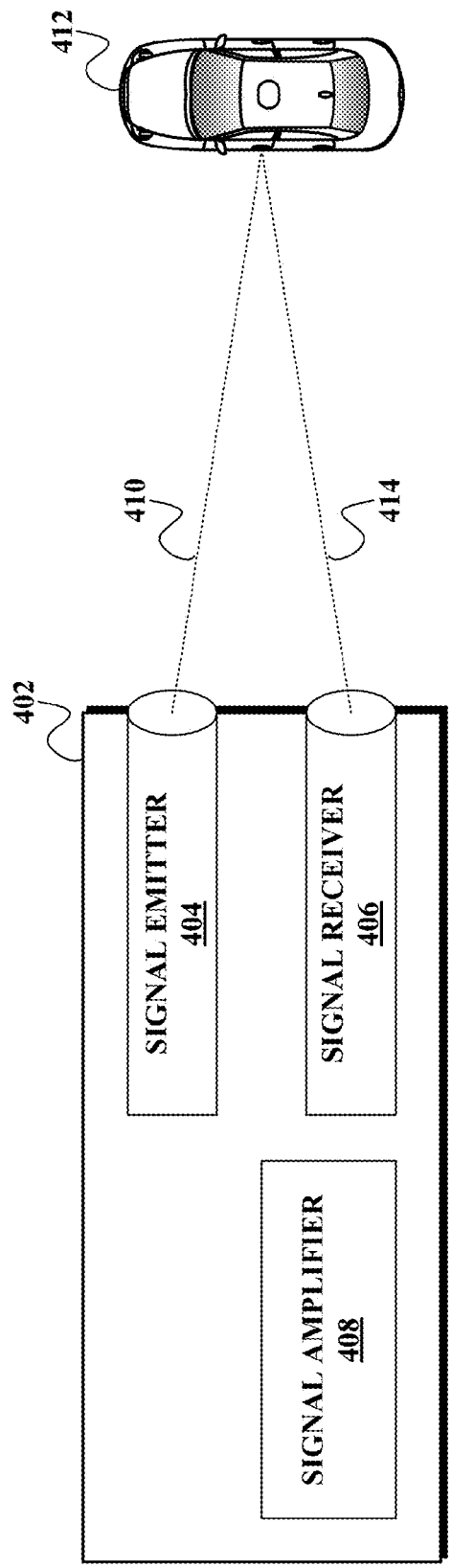
FIG. 4 shows a simplified block diagram of an example range-finding device.

In example embodiments, the above described methods may be carried out by suitable range-finding devices/systems. FIG. 4 shows a simplified block diagram of an example range-finding device 402. In various implementations, range-finding device 402 may be one of a RADAR device, a SONAR device, or a LIDAR device, among other examples. Range-finding device 402 may include signal emitter 404 (configured to emit emitted signal 410), signal receiver 406 (configured to receive reflected signal 414), and signal amplifier 408. Although the various elements of range-finding device 402 may be described herein as separate elements, it should be understood that the elements could just as well be physically integrated together or distributed in any suitable manner. Furthermore, it should be understood that range-finding device 402 may include one or more circuits and/or other elements not explicitly discussed herein. It should also be understood that range-finding device 402 may be integrated into other systems, including a system of an autonomous vehicle.

Signal emitter 404 may be configured to emit a signal (e.g., emitted signal 410) during a first period of time. Signal emitter 404 may be the same as, or similar to, the example signal emitters discussed above with respect to method 100 of FIG. 1A. Emitted signal 410 may be the same as, or similar to, the example emitted signals discussed above with respect to method 100 of FIG. 1A. Similarly, the first period of time may be the same as, or similar to the example first period of time discussed above with respect to method 100 of FIG. 1A.

More specifically, in one implementation, signal emitter 404 may be configured to transmit radio wave signals in the same, or similar, manner as was discussed above with respect to method 100 of FIG. 1A. Accordingly, emitted signal 410 may be a radio wave signal. In another implementation, signal emitter 404 may be configured to transmit sound signals in the same, or similar, manner as was discussed above with respect to method 100 of FIG. 1A. Accordingly, emitted signal 410 may be a sound wave. It should be understood that the above implementations are for example and explanation only. Other example implementations are also possible.

Signal receiver 406 may be configured to receive a reflected signal (e.g., reflected signal 414) during a second period of time. Signal receiver 406 may be the same as, or similar to, the example signal receivers discussed above with respect to method 100 of FIG. 1A. In particular, signal receiver 406 may be configured to receive radio wave signals and/or sound signals in the same, or similar, manner as was discussed above with respect to method 100 of FIG. 1A. Reflected signal 414 may be the same as, or similar to, the example reflected signals discussed above with respect to method 100 of FIG. 1A. Similarly, the second period of time may be the same as, or similar to the example second period of time discussed above with respect to method 100 of FIG. 1A.

Signal amplifier 408 may be configured to increase a signal gain that is applied to a received reflected signal (e.g., reflected signal 414) received by signal receiver 406 during a third period of time. Signal amplifier 408 may be the same as, or similar to, the example signal amplifiers discussed above with respect to method 100 of FIG. 1A. Similarly, the third period of time may be the same as, or similar to the example third period of time discussed above with respect to method 100 of FIG. 1A.

As depicted, range-finding device 402 may be in an environment which includes an object (e.g., vehicle 412). It should be understood that the environment may include multiple objects. Further, it should be understood that the object is depicted as a vehicle for example and explanation only. Other shapes, sizes, and/or object types are certainly possible.

Signal emitter 404, signal receiver 406, and signal amplifier 408 may be electrically coupled or otherwise communicatively coupled together. Furthermore, signal emitter 404, signal receiver 406, and signal amplifier 408 may each be in communication with a computing device and/or other processing components/devices, among other components/devices. In certain implementations, signal emitter 404 and signal receiver 406 may be integrated into a single element (e.g., a transceiver).

In operation, according to one implementation, signal emitter 404 may emit emitted signal 410 into the environment during the first period of time. Emitted signal 410 may propagate from range-finding device 402 to the environment and then reflect off of vehicle 412. Reflected signal 414 may then propagate from vehicle 412 to range-finding device 402. Signal receiver 406 may then receive reflected signal 414 during the second period of time. Simultaneously or subsequently, signal amplifier 408 may increase the signal gain applied to reflected signal 414 received by signal receiver 406 during the third period of time. Signal amplifier 408 may increase the signal gain in the same, or similar, manner as discussed above with respect to block 106 of FIG. 1A.

B. Example LIDAR Devices

Figure 5:
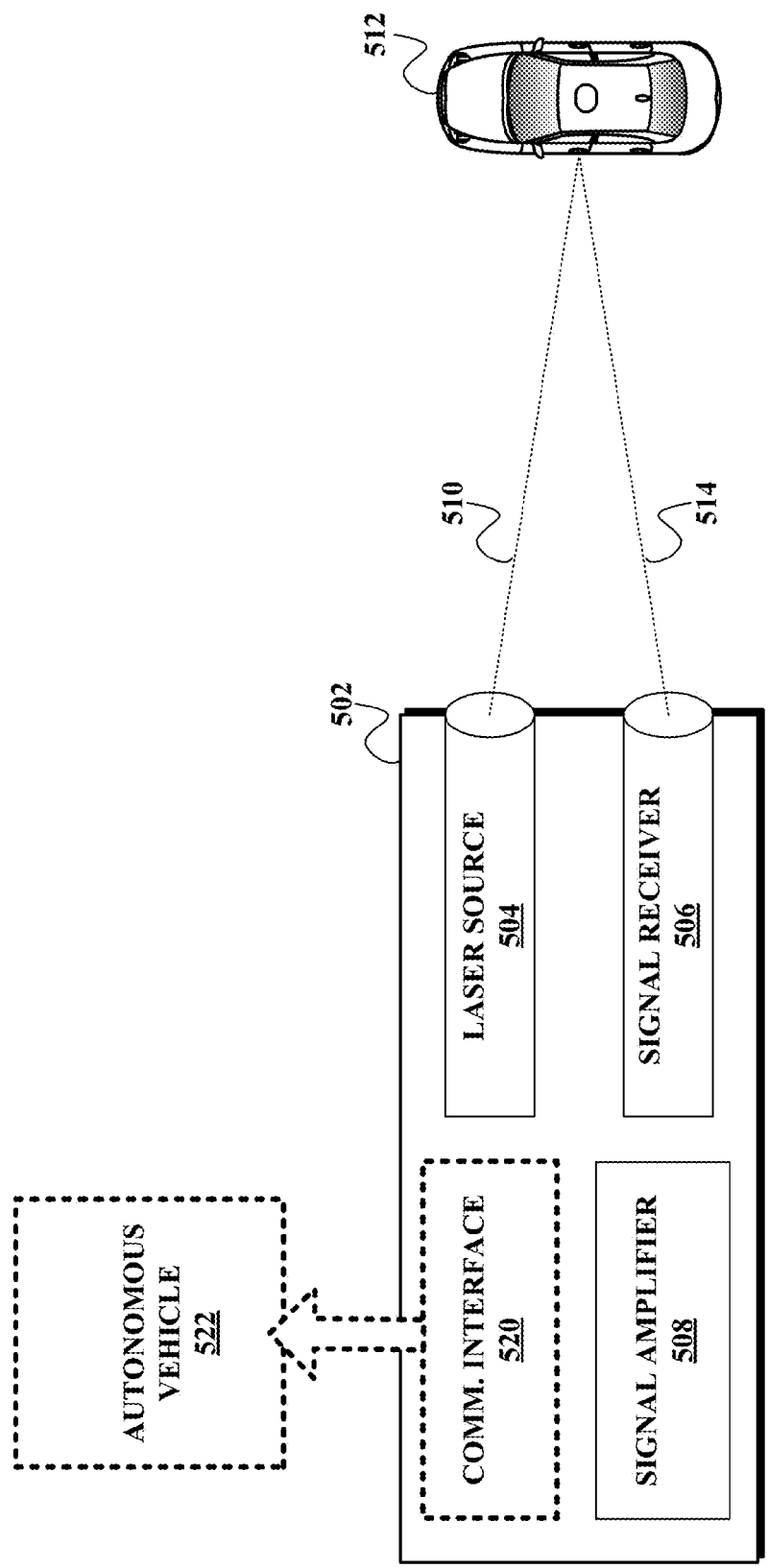
FIG. 5 shows a simplified block diagram of an example LIDAR device.

As noted, in some implementations, the example methods may be carried out by a LIDAR device. FIG. 5 shows a simplified block diagram of an example LIDAR device 502. LIDAR device 502 may include laser source 504 (configured to emit laser signal 510), signal receiver 506 (configured to receive reflected laser signal 514), and signal amplifier 508. In some implementations, LIDAR device 502 may also include various additional elements including, e.g., communication interface 520, among other elements. It should be understood that LIDAR device 502 may include a plurality of each component (e.g., LIDAR device 502 may include multiple laser sources, signal receivers, signal amplifiers and/or outputs). Although the various elements of LIDAR device 502 may be described herein as separate elements, it should be understood that the elements could just as well be physically integrated together or distributed in any suitable manner. Furthermore, it should be understood that LIDAR device 502 may include one or more circuits and/or other elements not explicitly discussed herein.

In certain implementations, as shown in FIG. 5, LIDAR device 502 may be coupled to or otherwise in communication with a second system/device, (e.g., a system of autonomous vehicle 522), perhaps via communication interface 520. Accordingly, communication interface 520 may include any suitable device, communication link, and/or protocol configured to output a signal to, or receive a signal from, a second system/device (e.g., a system of autonomous vehicle 522). Although LIDAR device 502 and autonomous vehicle 522 are depicted as separate devices, it should be understood that the devices could just as well be physically integrated together or distributed in any suitable manner.

Laser source 504 may be configured to emit a laser signal (e.g., laser signal 510) in a defined wavelength range during a first period of time. Laser source 504 may be the same as, or similar to, the example laser sources discussed above with respect to method 100 of FIG. 1A. Laser signal 510 may be the same as, or similar to, the example laser signals discussed above with respect to method 100 of FIG. 1A. The defined wavelength range may be the same as, or similar to, the example defined wavelength ranges discussed above with respect to method 100 of FIG. 1A. Similarly, the first period of time may be the same as, or similar to the example first period of time discussed above with respect to method 100 of FIG. 1A.

More specifically, in example implementations, the defined wavelength range may include a wavelength of about 905 nm, and the first period of time may be about 5 ns. In other example implementations, the defined wavelength range may include a wavelength of about 1550 nm, and the first period of time may be about 3 ns. These wavelengths and periods of time are for example and explanation only. Other wavelengths and periods of time are also possible.

Signal receiver 506 may be configured to receive a light signal (e.g., reflected laser signal 514) having wavelengths in the defined wavelength range during a second period of time. Signal receiver 506 may be the same as, or similar to, the example signal receiver discussed above with respect to method 100 of FIG. 1A. Reflected laser signal 514 may be a light signal having wavelengths in the defined wavelength range corresponding to laser signal 510 (i.e., reflected laser signal 514 may be laser signal 510 after having been reflected off of object 512). Additionally, the second period of time may be the same as, or similar to the example second period of time discussed above with respect to method 100 of FIG. 1A.

Signal amplifier 508 may be configured to increase a signal gain that is applied to a received light signal (e.g., reflected laser signal 514) received by signal receiver 506 during a third period of time. Signal amplifier 508 may be the same as, or similar to, the example signal amplifiers discussed above with respect to method 100 of FIG. 1A. In some implementations, signal amplifier 508 may be configured to increase a signal gain of multiple received light signals. Similarly, the third period of time may be the same as, or similar to the example third period of time discussed above with respect to method 100 of FIG. 1A.

As depicted, LIDAR device 502 may be in an environment which includes an object (e.g., vehicle 512). It should be understood that the environment may include multiple objects. Further, it should be understood that the object is depicted as a vehicle for example and explanation only. Other shapes, sizes, and/or object types are certainly possible.

Laser source 504, signal receiver 506, signal amplifier 508 and communication interface 520 may be electrically coupled or otherwise communicatively coupled together. Communication interface 520 may be coupled to a system of autonomous vehicle 522 or other example systems/devices. Furthermore, laser source 504, signal receiver 506, signal amplifier 508, and communication interface 520 may each be in communication with a computing device and/or other processing components/devices, among other components/devices.

In operation, according to example implementations, laser source 504 may transmit laser signal 510 into the environment during the first period of time. Laser signal 510 may propagate from LIDAR device 502 to the environment and then reflect off of vehicle 512. Reflected laser signal 514 may then propagate from vehicle 512 to LIDAR device 502. Signal receiver 506 may then receive reflected laser signal 514 during the second period of time. Simultaneously or sequentially, signal amplifier 508 may increase the signal gain applied to reflected laser signal 514 received by signal receiver 506 during the third period of time. Signal amplifier 508 may increase the signal gain in the same, or similar, manner as discussed above with respect to block 106 of FIG. 1A.

Furthermore, in some implementations, communication interface 520 may receive a signal from signal amplifier 508. In other implementations, communication interface 520 may receive the signal from signal receiver 506. The signal may be associated with the light signal received by the signal receiver. For example, the signal may be the light signal received by the signal receiver after the signal gain has been applied. In other examples, the signal may be the light signal received by the signal receiver without the signal gain increase being applied. Communication interface 520 may then prepare the signal to be sent to a second device/system (e.g., autonomous vehicle 522). For example, communication interface 520 may amplify, filter, convert, or otherwise alter the signal. Communication interface 520 may then pass the signal to autonomous vehicle 522 or a system/subsystem of autonomous vehicle 522. Autonomous vehicle 522 may then perform a variety of functions with the signal (e.g., create a laser point cloud image and/or determine whether the signal indicates that an object is present).

Accordingly, devices and systems have been described that may provide an increased dynamic range of a signal receiver. Such devices and systems may aid in detecting far-away objects.

IV. Example Computer-Readable Medium

Figure 6:
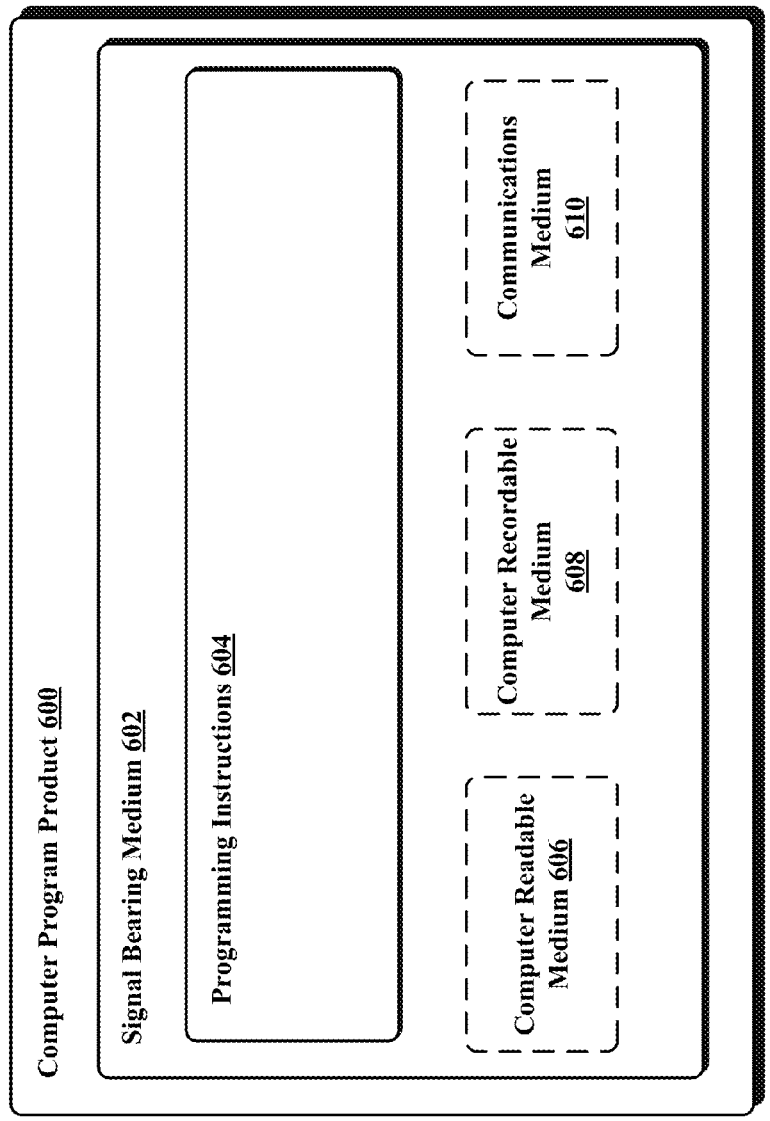
FIG. 6 shows a simplified block diagram of an example computer-readable medium

In some embodiments, the disclosed methods may be implemented by computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one implementation, an example computer program product 600 is provided using signal bearing medium 602. Signal bearing medium 602 may include one or more programming instructions 604 that, when executed by one or more processors may provide functionality or portions of the functionality described with respect to FIGS. 1A and 1B.

In some examples, signal bearing medium 602 may encompass a non-transitory computer-readable medium 606, such as, but not limited to, a hard disk drive, a Compact Disc (CD), a Digital Video Disk (DVD), a digital tape, memory, etc. In some implementations, signal bearing medium 602 may encompass computer recordable medium 608, such as, but not limited to, memory, read/write (R/W) CDs, R/W DVDs, etc. In other implementations, signal bearing medium 602 may encompass communications medium 610, such as, but not limited to, a digital and/or an analog communication medium (e.g., a fiber optic cable, a waveguide, a wired communications link, a wireless communication link, etc.). Thus, for example, signal bearing medium 602 may be conveyed by a wireless form of communications medium 610.

One or more programming instructions 604 may be, for example, computer executable and/or logic implemented instructions. In some examples, a computing device may be provided. For example, the computing device may be part of or otherwise coupled with range-finding device 402, LIDAR device 502, and/or an autonomous vehicle. The computing device may be configured to provide various operations, functions, or actions in response to programming instructions 604 conveyed to the computing device by one or more of computer-readable medium 606, computer recordable medium 608, and/or communications medium 610.

The non-transitory computer-readable medium could also be distributed among multiple data storage elements, which could be remotely located from each other. The computing device that executes some or all of the stored instructions could be a computing device that includes at least one processor. Further, the computing device may be one of multiple computing devices that execute some or all of the stored instructions.

V. Conclusion

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A method comprising:
    causing a signal emitter to emit a signal during a first period of time;
    receiving, at a signal receiver comprising a photodiode, a reflected signal during a second period of time, wherein the received reflected signal corresponds to the emitted signal, and wherein the second period of time begins after a beginning of the first period of time; and
    increasing a signal gain that is applied to the received reflected signal during a third period of time, wherein increasing the signal gain comprises increasing an operating voltage of the photodiode according to a predefined function of time, and wherein the third period of time begins not earlier than a beginning of the second period of time.

2. The method of claim 1, wherein the emitted signal is a laser signal.

3. The method of claim 2, wherein a wavelength of the emitted laser signal is one of 905 nanometers and 1550 nanometers.

4. The method of claim 1, wherein the first period of time is one of 3 nanoseconds and 5 nanoseconds.

5. The method of claim 1, wherein the signal receiver comprises a photodiode.

6. The method of claim 1, the method further comprising:
    increasing the operating voltage of the photodiode before the beginning of the third period of time.

7. The method of claim 1, wherein increasing the signal gain comprises increasing the signal gain substantially linearly during the third period of time.

8. The method of claim 1, wherein increasing the signal gain comprises increasing the signal gain non-linearly during the third period of time.

9. The method of claim 1, wherein increasing the signal gain comprises increasing the signal gain as a function of the amount of time elapsed since the beginning of at least one of the first period of time, the second period of time, and the third period of time.

10. The method of claim 1, wherein increasing the signal gain comprises increasing the signal gain based on at least one of a time of day, an ambient temperature, and an amount of ambient light.

11. The method of claim 1, wherein the third period of time begins at the same time the second period of time begins.

12. A light-detection and ranging (LIDAR) device, comprising:
    at least one laser source, wherein the at least one laser source is configured to emit a laser signal in a defined wavelength range during a first period of time;
    at least one signal receiver comprising a photodiode, wherein the at least one signal receiver is configured to receive a light signal having wavelengths in the defined wavelength range during a second period of time, wherein the second period of time begins after a beginning of the first period of time; and
    a signal amplifier configured to increase a signal gain that is applied to the light signal received by the at least one signal receiver during a third period of time, wherein the signal gain is increased by at least increasing an operating voltage of the photodiode according to a predefined function of time, and wherein the third period of time begins not earlier than a beginning of the second period of time.

13. The LIDAR device of claim 12, wherein the at least one laser source comprises at least one laser diode.

14. The LIDAR device of claim 12, wherein the defined wavelength range includes a wavelength of 905 nanometers, and wherein the first period of time is 5 nanoseconds.

15. The LIDAR device of claim 12, wherein the defined wavelength range includes a wavelength of 1550 nanometers, and wherein the first period of time is 3 nanoseconds.

16. The LIDAR device of claim 12, further including an output, wherein the output is coupled to an autonomous vehicle, such that the output passes a signal to the autonomous vehicle, wherein the signal is associated with the light signal received by the at least one signal receiver.

* * * * *